United States Patent Office 2,924,184
Patented Feb. 9, 1960

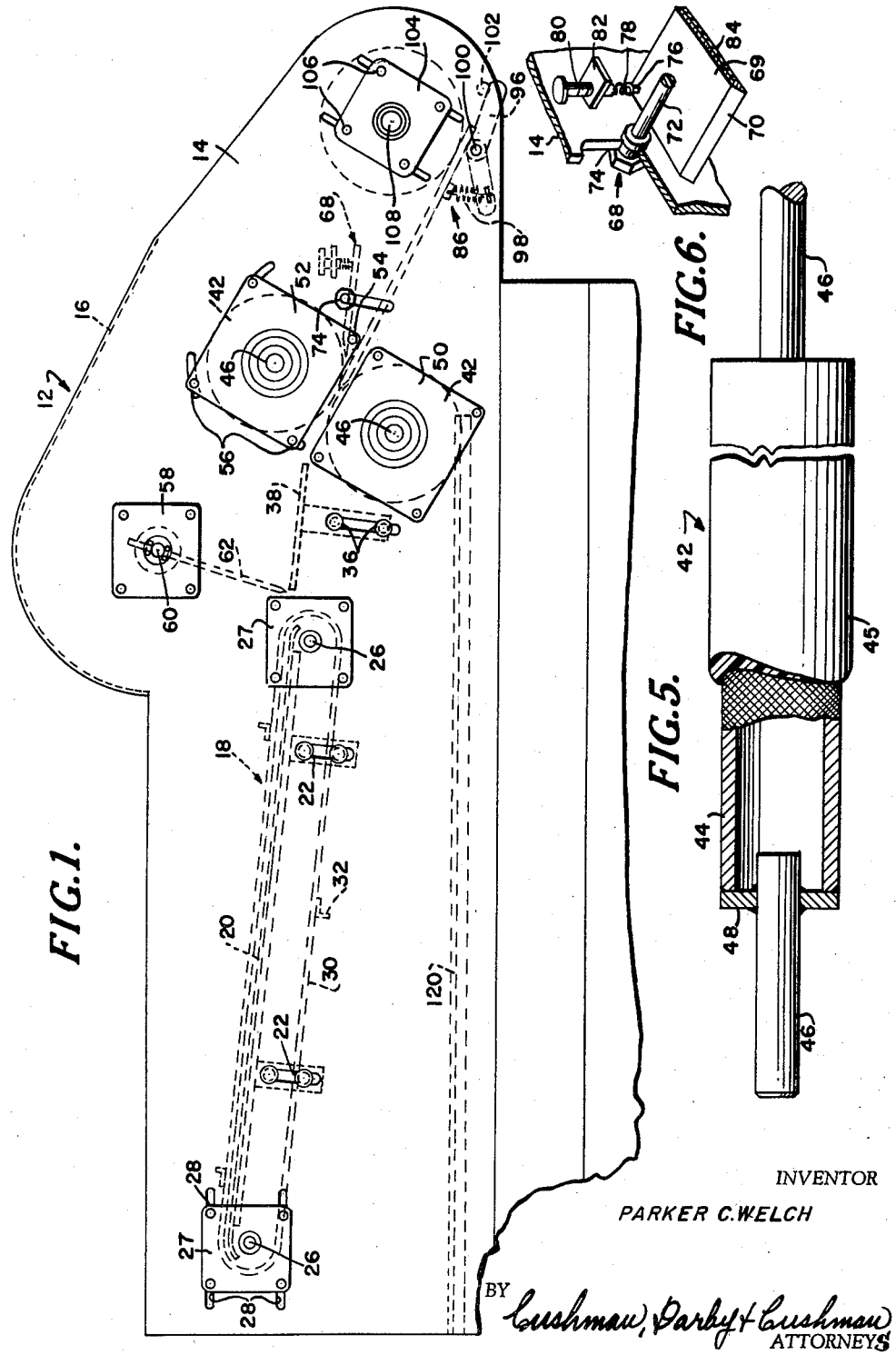

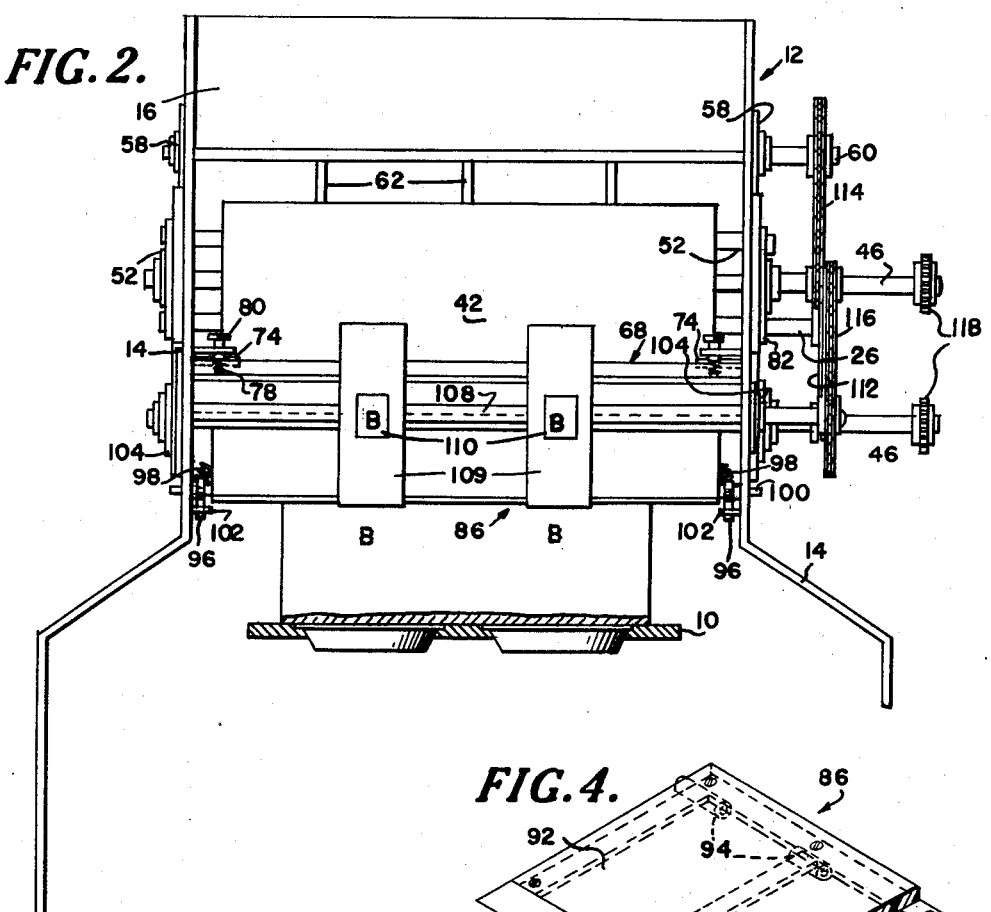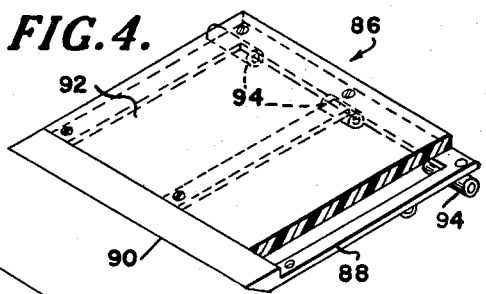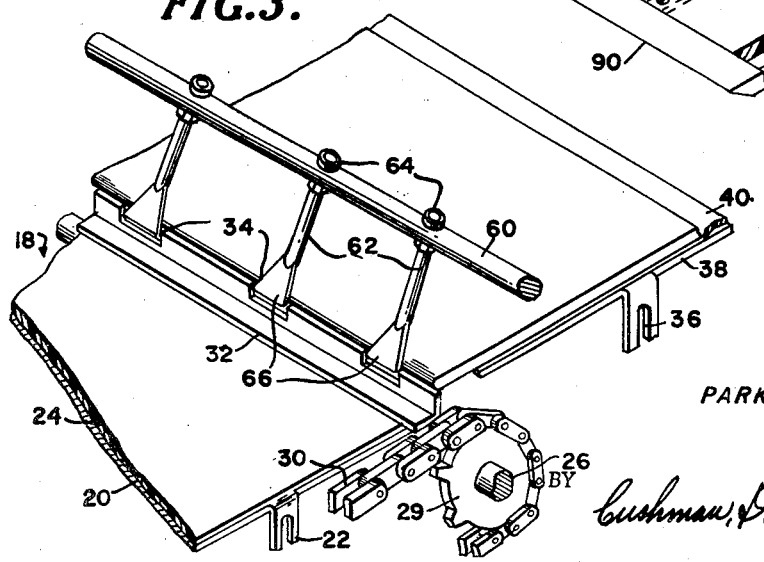

2,924,184

PIE MAKING MACHINE

Parker C. Welch, Louisville, Ky., assignor to Morton Packing Company, Louisville, Ky., a corporation of Kentucky Application June 6, 1955, Serial No. 513,286

6 Claims. (Cl. 107—12)

This invention relates to pastry making machines and more particularly to an improved dough sheeting device or mechanism for use in pie-making machinery.

One object of the present invention is to provide an improved dough sheeting mechanism that can be easily mounted for use in a pie-making machine and connected for timed operation therewith so as to deposit a sheet of dough in proper position on the pie plates moving on the machine.

Another object of the present invention is the provision of a dough sheeting mechanism of the type described which is timed to automatically operate in conjunction with the movement of the pie plates through the machine so as to permit optimum output of the machine with a minimum of manual labor.

A further object of the present invention is the provision of a dough sheeting mechanism of the type described having improved means incorporated therein for automatically stamping designs in the dough sheets, which designs will be properly positioned with respect to the pie plates.

A still further object of the present invention is the provision of a dough sheeting mechanism having improved dough engaging surfaces operable to substantially prevent sticking of the dough thereto during the sheeting operation thereby substantially eliminating the use of flour heretofore necessary for this purpose.

Still another object of the present invention is the provision of an improved dough sheeting roller having improved means thereon for preventing the dough from sticking thereto.

A still further object of the invention is the provision of a dough sheeting roller of the type described having improved means for removing the dough therefrom, such means including an antisticking surface for supporting the dough as it is removed from the roller.

Still another object of the present invention is the provision of an improved dough sheeting mechanism which is simple in construction, easy to operate and clean and economical to manufacture and maintain.

These and other objects of the present invention will become more apparent during the course of the following detailed description and appended claims.

The invention may best be understood with reference to the accompanying drawings wherein an illustrative embodiment is shown.

In the drawings:

Figure 1 is a side elevational view of a dough sheeting mechanism embodying the principles of the present invention;

Figure 2 is an end view of the mechanism shown in Figure 1;

Figure 3 is a fragmentary perspective view illustrating the manner in which the dough blocks are fed in timed relation into the rollers;

Figure 4 is a detailed perspective view of one of the members partly broken away;

Figure 5 is an enlarged elevational view of a sheeting roller partly broken away; and Figure 6 is a fragmentary perspective view showing the manner in which the other scraper member is mounted.

The dough sheeting mechanism of the present invention is adapted to be utilized in pie-making machines of known construction which include a main conveyor means having an endless series of pie plate supporting elements movable along a predetermined path of travel wherein the various pie making steps are carried out. One such machine is disclosed in Smith Patent No. 2,673,019, wherein the pie plate supporting elements are arranged to support a cluster of the four pie plates with each cluster being spaced a substantial distance apart.

The invention is particularly adapted to be used in connection with the pie-making machine disclosed in my copending application Serial No. 508,155 filed May 13, 1955. This machine includes a main conveyor means having a series of substantially flat pie plate holders such as are shown at 10 in Figure 2. The holders are arranged to support an endless series of equally spaced pie plates for movement along the operative run of the main conveyor means.

Referring now more particularly to Figures 1 and 2 of the drawings, the dough sheeting mechanism of the present invention is adapted to be mounted on the pie-making machine above the operative run thereof in a position to deliver or deposit successive sheets of dough in proper position on the pie plates moving thereunder.

The dough sheeting mechanism comprises a frame 12 including a pair of vertical side frame members 14 rigidly interconnected by any suitable means, such as top cover plate 16, in horizontally spaced relation. The lower ends of frame members 14 may be displaced outwardly for attachment in any suitable manner to the main frame of the pie-making machine (not shown). The upper rear end portion of the frame 12 between frame members 14 is preferably open so that successive blocks of dough may be deposited on a conveyor means, generally indicated at 18, located therebelow. It will be understood that such dough blocks may be formed of a predetermined amount of dough by machinery not shown, which may roll the blocks in a direction transverse to the extent of the frame members 14. Furthermore, the dough blocks may be fed onto the conveyor means 18 manually or by means of suitable machinery not shown.

The conveyor means 18 comprises an elongated plate 20 mounted between the frame members in a slightly inclined position for vertical adjustment by any suitable means, such as pin and slot connections 22. The upper surface of plate 20 is preferably covered by a coating or sheet 24 of Teflon (polytetrafluoroethylene), which serves to prevent sticking of the dough thereto as will be more fully explained hereinafter. Mounted between the frame members 14 in surrounding relation to the plate 20, is an endless conveyor including horizontally spaced shafts 26 suitably journaled in the frame members, as by journal plates 27, the rear pair of which is connected to the frame members for substantial horizontal adjustment by pin and slot connections 28 or the like. Rigidly mounted on the respective ends of the shafts 26 are pairs of aligned sprocket wheels 29. Chains 30 are trained about each pair of aligned sprocket wheels 29 and a plurality of widely spaced transverse pusher bars 32 are rigidly connected between selected corresponding links of the chains. As shown in Figure 3, each of these pusher bars is preferably constructed of an angle beam, the vertical flange of which is provided with a plurality of horizontally spaced notches or openings 34 for a purpose to be hereinafter more fully described. As can be seen in Figure 1, the plate and endless conveyor are positioned relative to each other so that the pusher bars during their upper substantially straight run will be disposed just above the plate 20 so as to engage the successive dough blocks fed thereon and to move the same toward the downwardly curved forward end thereof. As shown in Figure 3, the dough blocks are relatively flat and substantially in sheet form but have sufficient thickness so that the leading edge will travel beyond the curved forward end of the plate a substantial distance before the same will deflect downwardly an appreciable amount.

Mounted between the frame members 14 for substantial vertical adjustment, as by pin and slot connection 36, is a dead plate 38 disposed in a position to receive the leading edge of the dough block as it is moved from the plate 20 and to support the entire dough block as it moves from the forward curved end of the plate 20. This dead plate, like the plate 20, is preferably provided with an upper coating or sheet 40 of Teflon which engages the dough.

A pair of cooperating rollers 42 are disposed at the forward end of the dead plate 38 and are operable to roll the dough blocks into final sheet form. As best shown in Figure 5, each of the rollers 42 preferably comprises an inner member or pipe 44 having its outer surface knurled. A cylindrical tube 45 of Teflon is first expanded by heat and then inserted over the knurled surface of the pipe where it is allowed to cool so as to firmly secure the same thereto. A stub shaft 46 having a concentric disk 48 rigidly secured to one end thereof is fixedly mounted in each end of the pipe, as by welding the periphery of the disks thereto. The lower roller is journaled between the frame members 14 by any suitable means, such as journal plates 50 detachably mounted on the outer surfaces of the frame members. The upper roller is journaled by similar journal plates 52 which may be detachably connected to the frame members for pivotal movement toward and away from the journal plates 50, as by pivot pin 54 and pin and slot connections 56.

The dough blocks are fed from the dead plate 38 between the rollers by an automatic feeding means which will now be described. Journaled between a pair of plates 58 detachably mounted on the outer surface of the frame members 14, is a shaft 60. A plurality of horizontally spaced fingers or rods 62 extend radially outwardly from the shaft 60 and have their inner ends secured to the shaft by any suitable means, such as bolts 64, and their outer ends flattened as at 66. As shown in Figure 3, the flattened ends 66 of the fingers are adapted to enter within the notches 34 during their rotation with shaft 60 so as to engage the trailing edge of the dough block being moved onto the dead plate 38 and feed the same into the rollers 42.

An upper scraper member, generally indicated at 68, cooperates with the upper roller 42 and includes a transverse plate 69 having a sharpened edge 70 arranged to engage the peripheral surface of the upper roller. The scraper member 68 is mounted between the frame members 14 for substantial vertical adjustment and for biased pivotal movement about a transverse horizontal axis. As best shown in Figure 6, each end of the plate 69 has a stub shaft 72 secured thereto, as by welding or the like, the outer end of which is journaled in the adjacent frame member by any suitable means, such as a separable journal and slot connection 74. Adjacent each stub shaft 72 on the side of the plate 69 opposite edge 70 is an upstanding pin 76 arranged to receive one end of a coil spring 78, the outer end of which bears against the lower end of a bolt 80 threaded through a lug 82 extending inwardly from the adjacent frame member. Preferably, the lower surface of the plate 69 has a coating or sheet 84 of Teflon applied thereto.

A lower scraper member, generally indicated at 86, is mounted between the frame members 14 in a position so as to cooperate with the lower roller 42 and to support the dough sheet as it issues from between the rollers. As best shown in Figure 4, the lower scraper member comprises a skeletonized frame 88 having a transverse sharpened edge 90 at one end thereof and a sheet 92 of Teflon mounted on its upper surface in abutting relation to the cutting edge 90. Suitably secured below the opposite end of the frame 88, as by welding or the like, is a plurality of spaced tubular elements 94, the outer ones of which extend beyond the sides of the frame. Pivotally mounted on the outwardly extending end of each tubular element 94 is the central hub of a bell crank 96. The outer end of the rearward arm of each bell crank 96 has connected thereto one end of a spring 98, the other end of which is connected with the frame 88. The lower scraper member is mounted between frame members 14 by a pivot shaft 100 extending through the frame members and the tubular elements 94 so that the outer surfaces of the central hubs of the bell cranks will engage the adjacent inner surfaces of the frame members. The forward arm of each bell crank engages an abutment 102 formed on the inner surface of the adjacent frame member to prevent the bell crank from pivoting in the direction of bias by spring 98 so that the latter will bias the edge 90 into engagement with the peripheral surface of the lower roller 42.

Disposed above the lower end of scraper member 86 is a pair of journal plates 104 adjustably mounted on the frame members by any suitable means, such as pin and slot connections 106. A shaft 108 is journaled in the plates 104 and has fixedly secured thereto, a plurality of horizontally spaced wheel or roller members 109. The periphery of each wheel 109 is arranged to detachably receive a design forming element 110 which operates during the rotation of the wheel to form a predetermined design in the dough supported by the lower end of the scraper member 86.

As was briefly indicated above, the mechanism of the present invention is adapted to deliver formed dough sheets in proper position over the pie plates supported by the holders moving therebelow. Thus, the sheeted and stamped dough issuing from the forward end of the scraper member 86 will fall onto the tops of the pie plates therebelow. In order to insure that the formed dough will properly register with the pie plates, the mechanism of the present invention is driven in timed relation to the movement of the holders or main conveyor means of the pie-making machine. It will be understood that any suitable driving means may be provided for this purpose, one form of which is shown in the drawings as embodying a sprocket and chain system. In brief, the system includes a chain 112 connecting the forward conveyor shaft 26 with the shaft 46 of the lower roller 42, a chain 114 connecting the feeding means shaft 60 with the shaft 46 of the upper roller, and a chain 116 connecting the shaft 46 of the upper roller with the shaft 108 of the design stamping wheels. The ends of the roller shafts 46 may be extended outwardly to receive sprocket wheels 118 from which the system may be suitably driven by appropriate chains connected thereto and to a source of rotary motion from the pie-making machine.

From the above, it is believed that the operation of the dough sheeting mechanism of the present invention will be apparent. In brief, a dough block fed onto the plate 20 will be engaged by a pusher bar 32 and moved from the plate 20 onto dead plate 38. The fingers 62 then operate to engage the trailing edge of the dough sheet and move it from the dead plate into the cooperating rollers 42. The sheeted dough issuing from between the rollers is supported by the lower scraper member 86 which, together with the upper scraper member insures that the Teflon surface of the rollers will remain clean. At the lower end of the scraper member 86, the dough is stamped at intervals with a design by the elements 110.

Thereafter, the stamped and sheathed dough is delivered or falls upon the tops of the pie plates where it may be either operated upon to form an upper crust or a lower crust of the pie.

Since the various moving elements of the mechanism are driven in timed relation to the travel of the pie plate holders of the pie-making machine, it will be seen that the dough block fed onto plate 20 will not be moved onto the dead plate until a pusher bar 32 engages the same at the proper time. Likewise, the movement of the fingers 62 are timed with respect to the movement of the pusher bars so that they will not operate to feed the dough block into the rollers until the proper time arrives. In a like manner, the stamping elements are timed so as to form a design in the dough issuing from the rollers which will be positioned in the central portion of the pie plates as the dough sheet falls thereon. It will be noted that in Figure 1 there is shown a tray 120 suitable to catch any dough scraps that may fall from the various elements of the mechanism during their operation.

A significant feature of the present invention resides in the provision of Teflon on substantially all of the dough contacting surfaces of the mechanism. It has been found that this material is particularly effective in preventing the dough from sticking to its contacting surfaces, so much so that it is virtually unnecessary to supply flour to the dough as it is moved through the mechanism. In any event, this feature greatly reduces the amount of flour necessary, thereby substantially eliminating the mess and other disadvantages caused thereby.

The journal plate construction for mounting the various operating elements between the frame members enables the elements to be quickly and easily removed bodily for cleaning which is a major consideration in the handling of any edible product.

In addition, the design of the mechanism is such that with only slight modification and/or removal of certain of the operating elements, a continuous sheet of dough can be produced which is particularly desirable in the pie-making machine of my aforesaid copending application.

It is to be understood that the forms of the invention herewith shown and described are to be taken as the preferred embodiments of the same and that various changes may be made without departing from the spirit of the invention and the scope of the appended claims.

I claim:

1. A dough sheeting mechanism comprising a frame including horizontally spaced vertical frame members, an elongated plate secured between said frame members for receiving successive blocks of dough, an endless conveyor secured between said frame members adjacent said plate and having a plurality of spaced transverse pusher bars arranged to engage the successive dough blocks received on said elongated plate and move the same toward one end thereof, a second plate fixedly mounted between said frame members at said one end of said elongated plate for receiving the dough blocks moved from said first plate, upper and lower cooperating dough rollers mounted between said frame members adjacent said second plate, means for feeding the dough blocks from said second plate between said rollers, a scraper member having an edge resiliently urged into engagement with the periphery of said lower roller and extending therefrom for supporting the dough issuing from between said rollers, and a stamping roller mounted between said frame members above said scraper member for forming a design in the dough supported by said scraper member after the same has been rolled in sheet form by said rollers.

2. A dough sheeting mechanism as defined in claim 1 wherein said dough block feeding means comprises a plurality of horizontally spaced fingers mounted between said frame members above said second plate for rotation about a transverse horizontal axis.

3. A dough sheeting mechanism as defined in claim 2 wherein said pusher bars are provided with horizontally spaced openings through which said fingers pass to engage the adjacent dough block and transfer the same from said second plate between said rollers.

4. A dough sheeting mechanism as defined in claim 1 wherein said scraper members are pivotally mounted between said frame members and have springs connected therewith for urging their edges into engagement with the respective peripheries of said rollers.

5. In a pie-making machine, conveyor means for receiving dough, upper and lower cooperating dough rollers rotatable in opposite directions to roll dough therebetween into sheet form, means for moving the dough from said conveyor means to a position between said rollers to be rolled thereby, said moving means including a supporting plate fixedly mounted in a position to receive the dough as it issues from said conveyor means and to support the same for movement into a position between said rollers to be rolled thereby, a scraper member having an edge in engagement with the periphery of said lower roller and extending therefrom to support the rolled dough issuing from between said rollers, and a stamping roller disposed above said scraper member for stamping a design in the rolled dough on said scraper member at predetermined intervals.

6. A dough sheeting mechanism comprising a frame including horizontally spaced vertical frame members, an elongated plate secured between said frame members for receiving successive blocks of dough, an endless conveyor secured between said frame members adjacent said plate and having a plurality of spaced transverse pusher bars arranged to engage successive dough blocks received on said elongated plate and to move the same toward one end thereof, a second plate fixedly mounted between said frame members at said one end of said elongated plate for receiving the dough blocks moved from said first plate, upper and lower cooperating dough rollers mounted between said frame members adjacent said second plate, and means for feeding the dough blocks from said second plate into a position between said rollers to be rolled into sheet form thereby.

References Cited in the file of this patent

UNITED STATES PATENTS

| Number | Name | Date |
|---|---|---|
| 376,068 | Chase | Jan. 10, 1888 |
| 1,831,531 | Harber | Nov. 10, 1931 |
| 2,159,044 | Paterson | May 23, 1939 |
| 2,160,783 | McDonald | May 30, 1939 |
| 2,200,347 | Smith | May 14, 1940 |
| 2,405,661 | MacManus | Aug. 13, 1946 |
| 2,586,089 | Rhodes | Feb. 10, 1952 |
| 2,655,876 | Stickelber | Oct. 20, 1953 |
| 2,699,737 | Sticelber | Jan. 18, 1955 |
| 2,715,879 | Sawyer | Aug. 23, 1955 |
| 2,732,927 | Hansen | Jan. 31, 1956 |